United States Patent [19]
Haferer

[11] 3,804,126
[45] Apr. 16, 1974

[54] PLUG DEVICES

[75] Inventor: Willi-Gunter Haferer, Stafford, England

[73] Assignee: James A. Jobling & Company Limited, Sunderland, England

[22] Filed: Aug. 14, 1972

[21] Appl. No.: 280,171

[30] Foreign Application Priority Data
Aug. 16, 1971  Great Britain.................... 38,350/71

[52] U.S. Cl...................... 138/89, 138/90, 220/24.5
[51] Int. Cl........................ F16l 55/12, B65d 39/12
[58] Field of Search .............. 138/89, 90; 220/24.5; 128/218 P, 218 PA; 285/302, 382; 73/49.8

[56] References Cited
UNITED STATES PATENTS

| | | | |
|---|---|---|---|
| 3,243,207 | 3/1966 | Carpenter et al............... | 285/382 X |
| 3,355,194 | 11/1967 | Rasmussen......................... | 285/302 |
| 3,420,274 | 1/1969 | Buttery et al..................... | 138/89 X |

*Primary Examiner*—Charles A. Ruehl
*Attorney, Agent, or Firm*—Karl W. Flocks

[57] ABSTRACT

A plug device, such as a closure member for a chromatography column, comprises a hollow deformable sleeve member having an internal screw thread, a body member fitting within the sleeve member and having an external screw thread engaging the internal thread of the sleeve member, annular recesses being formed in both the internal wall of the sleeve member and external wall of the body member arranged so that the two recesses are aligned and face each other when the body member is screwed into the sleeve member, and a resilient ring member fitting tightly within the two recesses so as to urge the sleeve member outwardly around the annular recesses to form a tight seal when located in a surrounding tube and to resist unscrewing of the body member from the sleeve member.

12 Claims, 3 Drawing Figures

3,804,126

PLUG DEVICES

BACKGROUND OF THE INVENTION

The invention relates to plug devices for fitting tightly within a surrounding tube. This includes plug devices intended to remain stationary in a surrounding tube or movable members such as pistons or the like.

For various purposes plug devices are required for insertion into tubes and in some cases a good fluid seal with the tube is important. One such example is the end closure member of a chromatography column. In such a case, it may be desirable for the plug to be screwed onto a body member which projects from the chromatography column and permits adjustment of the axial position of the plug within the tube.

It is an object of the present invention to provide a plug device which achieves an improved seal with a surrounding tube and includes a screw connected body member which resists disconnection on rotation of the body.

SUMMARY OF THE INVENTION

The invention provides a plug device for fitting tightly within a tube, which plug device comprises a hollow deformable sleeve member having an internal screw thread, a body member fitting within the sleeve member and having an external screw thread engaging the internal thread of the sleeve member, annular recesses being formed in both the internal wall of the sleeve member and external wall of the body member arranged so that the two recesses are aligned and face each other when the body member is screwed into the sleeve member, and a resilient ring member fitting tightly within the two recesses so as to urge the sleeve member outwardly around the annular recesses to form a tight seal located in a surrounding tube and to resist unscrewing of the body member from the sleeve member.

In order that the resilient ring may resist unscrewing of the body member, each recess preferably comprises a channel having opposite side walls which are planar and parallel with each other. Preferably each recess comprises a channel of rectangular cross-section. The ring member may conveniently comprise a resilient "0" ring and may for example be made of rubber.

In some applications it may be desirable to adjust the axial position of the plug device when located in a surrounding tube. For this purpose, the body member may be connected to a screw threaded adjusting device so that the body member may be rotated to adjust the axial position of the plug device.

To achieve a good seal within a surrounding tube, it is necessary for the sleeve member to be made of a deformable material. For many applications it may be desirable for the sleeve member to be chemically inert and for this reason, the sleeve member may conveniently be made of polytetrafluoroethylene.

In some applications of the plug device, a passageway may be provided through the body member and sleeve member to allow fluid passage therethrough.

In other applications, the plug device may be required to act as a closed piston and in this case, the sleeve member may have a closed end wall providing a closed piston face. The invention includes a pump having such a closed piston device.

DESCRIPTION OF THE PREFERRED EMBODIMENTS

Figure 1:
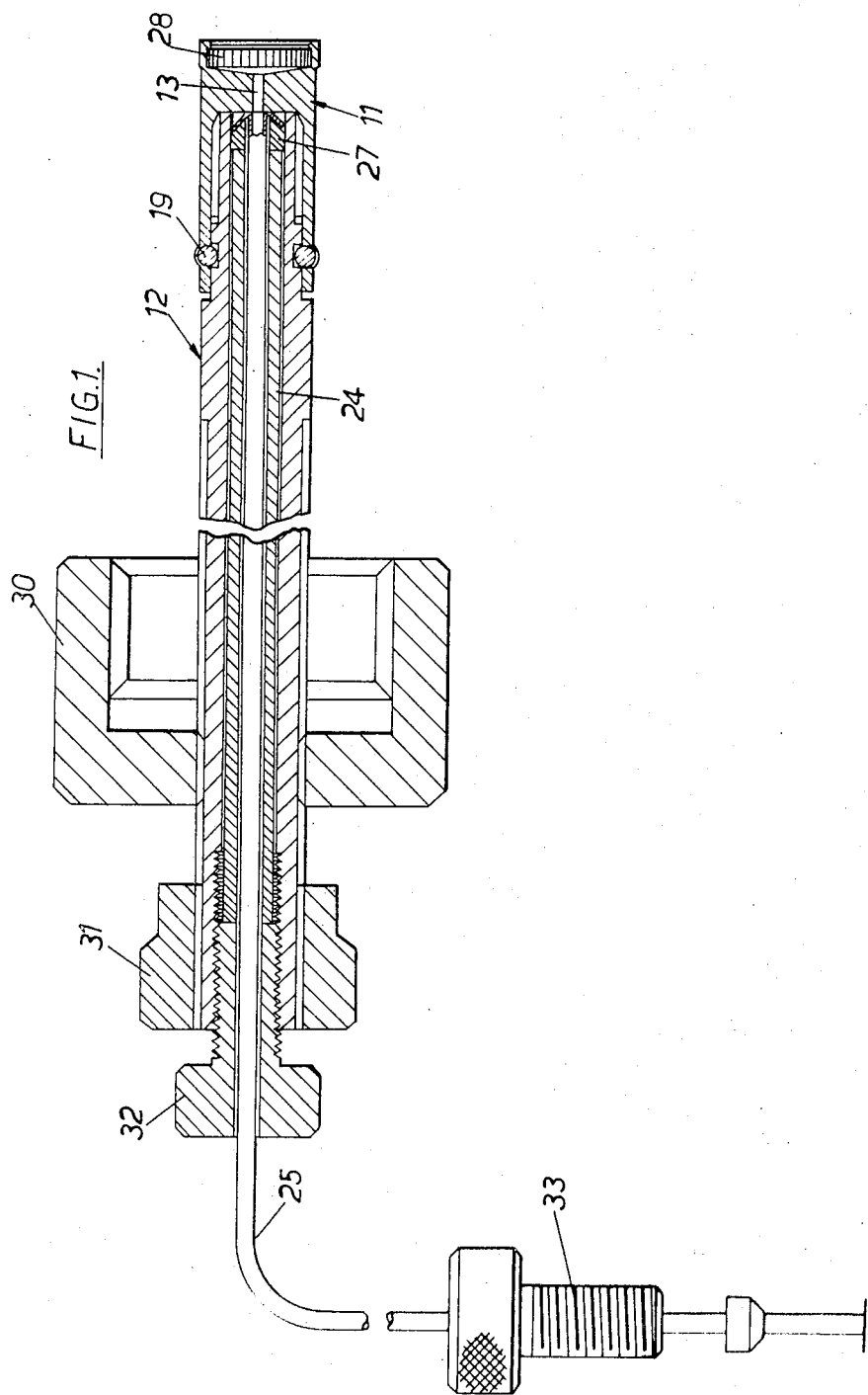
FIG. 1 shows an end unit for a chromatography column embodying the present invention.
Figure 2:
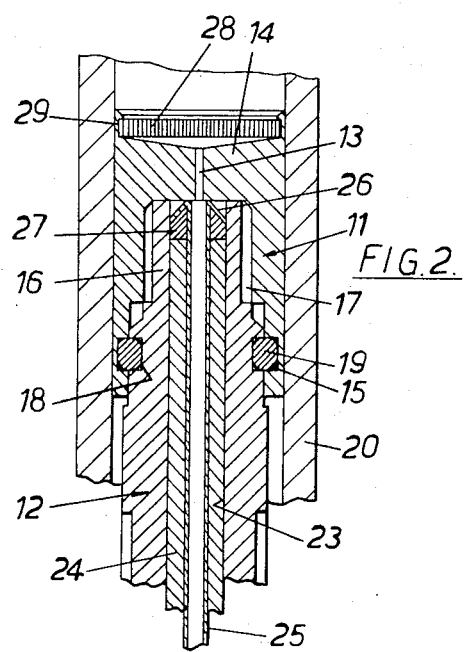
FIG. 2 shows part of the device shown in FIG. 1 mounted in a chromatography column.

The plug device used in FIG. 1 is shown more clearly in FIG. 2. The device comprises a hollow deformable sleeve member 11 surrounding one end of a central body member 12. The sleeve 11 is formed with a central bore 13 in the upper end wall 14 of the sleeve. An annular recess 15 in the form of a channel of rectangular cross-section is formed around the inner surface of the lower part of the sleeve 11. The body 12 comprises an elongated hollow rod of circular cross-section. The upper end 16 of the rod is of reduced diameter and is externally screw threaded so as to engage an internal screw thread 17 formed in the sleeve 11. An annular recess 18 is formed around the body 12. The recess 18 comprises a channel of rectangular cross-section similar to the recess 15 and is positioned so as to be aligned with and face the recess 15 when the body 12 is screwed fully into the sleeve 11 as shown in FIG. 2.

A rubber 0 ring 19 is tightly compressed in both the recesses 15 and 18 so as to fill the recesses and urge the side walls of the sleeve 11 adjacent the recess 15 outwardly against a tube 20 within which the plug device is located. When the body is screwed fully into the sleeve 11, the upper end of the body engages the end wall 14 and limits the extent to which the body can be screwed into the sleeve. The body 11 has a central bore 23 aligned with the passage 13 through the end of the sleeve 11. Located within the bore 23 is a hollow spacer rod 24 closely surrounding a central tube 25. The upper end of the tube 25 has a flange 26 fitting over an annular washer 27 resting on the upper end of the spacer rod 24. The spacer rod 24 pushes the washer 27 towards the end wall 14 of the sleeve 11 so that the flange 26 forms a tight seal against the end wall 14 surrounding the passage 13. A porous disc 28 covers the upper end of the sleeve 11 and is held in place by an annular lip 29 formed at the upper end of the sleeve 11.

In order to assemble the plug device of FIG. 2, the ring 19 is positioned in the recess 15 in the sleeve 11. The upper end of the body 12 can then be passed through the ring 19 so as to engage the internal screw thread in the sleeve 11. Rotation of the body 12 then screws the body into the sleeve 11 forcing the region of the body of larger diameter through the ring 19 until the recess 18 becomes aligned with the recess 15 and the ring 19 snaps into position in the recess 18. In this position the body is screwed fully into the sleeve 11 and the ring 19 resists unscrewing of the body 12. The ring 19 causes a small annular bulge in the side wall of the sleeve 11 and thereby forms a tight sealing fit when the plug is pushed into a tube 20 as shown in FIG. 2. If the body 12 is rotated when the plug is in the tube 20, rotation in either direction will not cause the body to become unscrewed from the sleeve 11. If it is necessary to unscrew the body from the sleeve, the plug may be withdrawn and the sleeve 11 tightly held whilst considerable unscrewing force is applied to the body 12.

The tube 20 in FIG. 2 comprises part of a chromatography column containing column packing above the disc 28. FIG. 1 shows the plug device arranged as a closure member for the chromatography column. FIG. 1 has omitted, for the sake of clarity, the surrounding tube 20 and shows the annular deformation in the sleeve 11 around the resilient ring 19. Surrounding the lower part of the body 12 is an end cap 30 which screw threadedly engages an external thread on the lower part of the body 12. The cap 30 may be secured to the lower end of the chromatography tube 20. The lower end of the body 12 projects through the cap 30 and has bonded to it an annular collar 31 which may be used for rotating the body 12 relative to the cap 30 so as to adjust the axial position of the plug device within the chromatography column. The lower end of the spacer rod 24 abuts against a rotatable member 32 which screw threadedly engages an internal bore in the end of the body 12 remote from the sleeve 11. The member 32 can be adjusted so as to move the spacer rod towards the sleeve 11 and thereby seal the flange 26 against the sleeve 11. The central tube 25 passes freely through the member 32 and is surrounded by a coupling unit 33 which can be used to connect the tube to a source of circulating liquid for the chromatography column. In use in a chromatography column, the tube 20 (shown in FIG. 2) will be filled with a suitable packing material held in position by the plug device. The cap 30 is secured to the bottom of the tube 20 and the collar 31, and thereby body 12, rotated to adjust the axial position of the plug device until the porous disc 28 fits against the end of the packing in the column leaving no gap. Liquid may then be circulated through the column, the liquid passing along the tube 25 through the passage 13 and through the porous disc 28. The provision of the 0 ring 19 not only ensures a tight sealing fit for the plug device within the tube 20, it also enables the body 12 to be rotated and withdrawn from the tube 20 without unscrewing from the sleeve 11. When the body 12 is rotated to push the plug device further into the tube 20, the screw threads are arranged such that the body remains tightly screwed against the sleeve 11 and thereby prevents any break in the seal between the flange 26 and the end wall 14 of the sleeve 11.

In this particular example, it is desirable for the sleeve 11 and central tube 25 to be made of chemically inert material. They may for example be made of polytetrafluoroethylene. The porous disc 28 is also made of porous polytetrafluoroethylene. In this way, the fluid circulated through the chromatography column is prevented from contacting material other than these chemically inert components. The ring 19 may conveniently be made of rubber and the spacer rod 24 may be made of, for example, nylon, stainless steel or other suitably inert material. The washer 27, cap 30 and body 12 may be made, for example, of a polyacetal resin.

Figure 3:
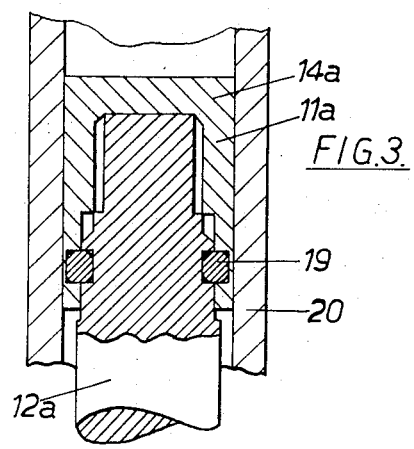
FIG. 3 shows a closed plug device embodying the present invention.

FIG. 3 shows an alternative arrangement where the plug device is provided with a closed face at its upper end. In this case, the sleeve 11a is generally similar to that already described with reference to FIG. 2 except that it has a closed end wall 14a. A central body 12a is also similar to the previously described body 12 except that it is formed as a solid member. The rubber ring 19 serves the same purpose of providing a good seal between the sleeve 11a and surrounding tube 20. It also prevents unwanted unscrewing of the body 12a from the sleeve 11a. This plug shown in FIG. 3 is particularly suitable for use as a moving piston and is applicable to use in a dosage pump. The surrounding tube 20 may be made of any convenient material such as for example, glass or glass loaded with polytetrafluoroethylene. The device shown in FIG. 3 can also be used in syringes, dispensers, diluters or any equipment where volumes of liquid are to be delivered by force under pressurized or non-pressurized conditions.

The invention is not limited to the details of the foregoing examples. The plug device may be moved along the tube by rotating or non-rotating action. Although polytetrafluoroethylene is particularly suitable for use on a moving piston due to its chemically inert nature and low friction, other materials may be used. The plug devices described in the above examples may vary in diameter from, for example, 10 mm to 100 mm. The tightness of the fit of the plug device within the tube 20 can be adjusted by selection of a suitable ring 19 to give the required tightness of fit. With a 10 mm diameter tube 20, the plug device can be such a tight fit as to withstand many hundreds of pounds per square inch pressure. The above numerical figures are of course given by way of example only.

The tube 20 can be made of any suitable material, including for example, glass or plastics material. For some applications it may be necessary for the tube to be transparent or translucent. For some applications it may be necessary for the internal surface of the tube 20 to have a smooth or polished finish.

I claim:

1. A plug device for fitting tightly within a tube, which plug device comprises a hollow deformable sleeve member having an internal screw thread, a body member fitting within the sleeve member and having an external screw thread engaging the internal thread of the sleeve member, annular recesses being formed in both the internal wall of the sleeve member and external wall of the body member arranged so that the two recesses are aligned and face each other when the body member is screwed into the sleeve member, and a resilient ring member fitting tightly within the two recesses so as to urge the sleeve member outwardly around the annular recesses to form a tight seal when located in a surrounding tube and to resist unscrewing of the body member from the sleeve member.

2. A plug device as claimed in claim 1, in which each recess comprises a channel the opposite side walls of which are planar and parallel with each other.

3. A plug device as claimed in claim 2, in which each recess comprises a channel of rectangular cross-section.

4. A plug device as claimed in claim 3 in which the ring member comprises a resilient "0" ring.

5. A plug device as claimed in claim 1 in which the body member and sleeve member each have an abutment surface arranged to engage each other when the said recesses are aligned and limit the extent to which the body member may be screwed into the sleeve member.

6. A plug device as claimed in claim 1 in which the body member is connected to a screw threaded adjusting device so that the body member may be rotated to adjust the axial position of the plug device.

7. A plug device as claimed in claim 1 in which the sleeve member is made of polytetrafluoroethylene.

8. A plug device as claimed in claim 1 in which the sleeve member has a closed end wall providing a closed piston face.

9. A plug device as claimed in claim 1 in which a passageway is provided through the body member and sleeve member to allow fluid passage therethrough.

10. A plug device as claimed in claim 9 in which a porous disc is secured to the sleeve member covering the outlet of the passage through the sleeve member.

11. A plug device as claimed in claim 9 in which a central tube extends through the passageway in the body member, one end of the tube sealing against an end wall of the sleeve member around the passageway through the sleeve member.

12. A chromatography column comprising a hollow tube for containing packing material and a plug device fitting tightly within the tube and closing the lower end of the tube, which plug device comprises a hollow deformable sleeve member having an internal screw thread, a body member fitting within the sleeve member and having an external screw thread engaging the internal thread of the sleeve member, annular recesses being formed in both the internal wall of the sleeve member and external wall of the body member arranged so that the two recesses are aligned and face each other when the body member is screwed into the sleeve member, and a resilient ring member fitting tightly within the two recesses so as to urge the sleeve member outwardly around the annular recesses to form a tight seal against the surrounding tube.

* * * * *